July 16, 1946.   L. FRANK   2,404,130
STRAINER OR EGG POACHER
Filed March 8, 1944
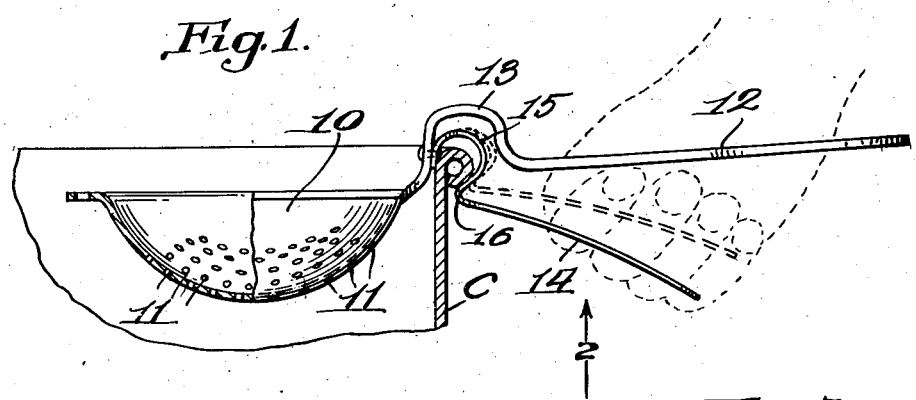
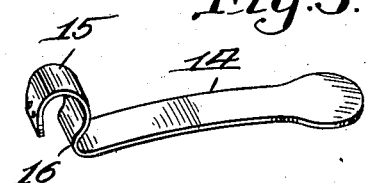
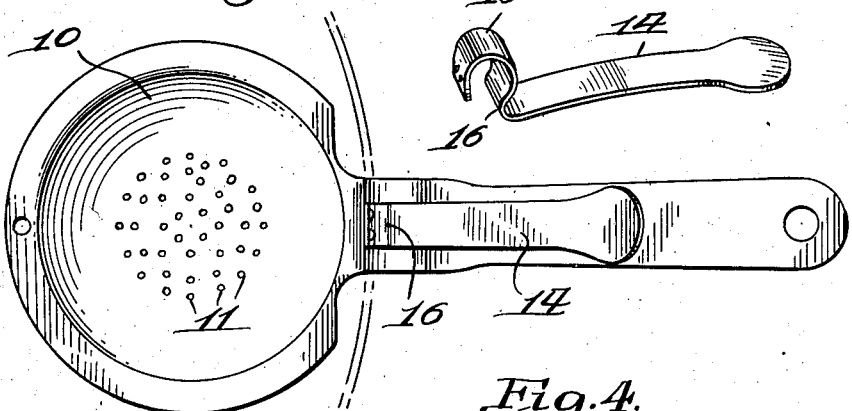
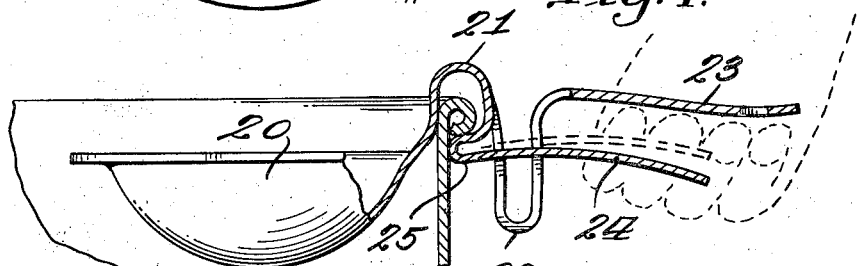
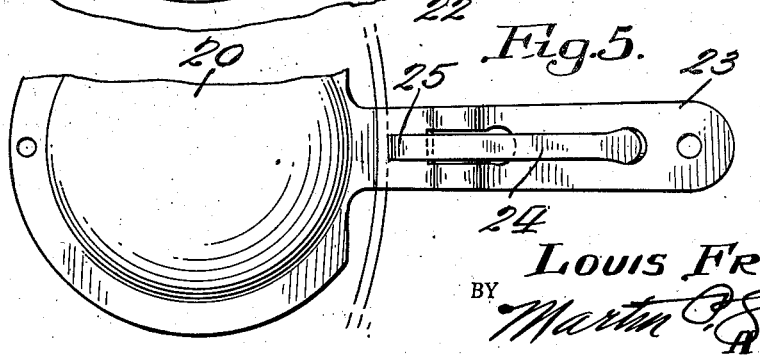
INVENTOR.
LOUIS FRANK.
BY
ATTORNEY.

Patented July 16, 1946

2,404,130

UNITED STATES PATENT OFFICE 2,404,130

STRAINER OR EGG POACHER

Louis Frank, Fellows, Calif.

Application March 8, 1944, Serial No. 525,620

1 Claim. (Cl. 220—94)

My invention relates to a culinary utensil particularly designed to function as a strainer and for poaching eggs, and the principal object of my invention is to provide a simple, practical and inexpensive device that includes a shallow bowl shaped body and a handle, with which is combined a resilient latch or clip, constructed and arranged so as to firmly grip the edge of a pan, bowl or other container and thereby hold the utensil in proper position for use.

A further object of my invention is to provide a utensil of the character referred to, wherein the latch or clip may be formed integral with the bowl and handle, or separately formed and permanently secured thereto, by means of rivets, spot welding or otherwise.

With the foregoing and other objects in view, my invention consists in certain novel features of construction and arrangement of parts which will be hereinafter more fully described and claimed and illustrated in the accompanying drawing in which:

Fig. 1 is an elevational view partly in section and showing a strainer form of the invention mounted on the edge of a container.

Fig. 2 is a bottom view.

Fig. 3 is a perspective view of the resilient clip or latch.

Fig. 4 is an elevational view partly in section and showing the egg poacher form of the invention with an integral latch.

Fig. 5 is a bottom view of the form of utensil seen in Fig. 4.

Referring by numerals to the accompanying drawing and particularly to the strainer form illustrated in Figs. 1, 2 and 3, 10 designates a shallow bowl which may be formed of sheet metal, heat resistant plastics or the like, said bowl being perforated as designated by 11 and formed integral with the edge of the bowl is an outwardly projecting handle 12, having an inverted U-shaped portion 13 near the edge of said bowl.

The latch or clip used for detachably securing the strainer to a container such as C comprises a narrow strap or handle portion 14 of resilient metal or plastics and formed on the inner end of this handle is an inverted U-shaped member 15, the free end of which is secured to the lower portion of the leg of U-shaped member which connects with the edge of the container and thus said member 15 is positioned within said member 13.

A forwardly presented lip 16 is formed at the juncture between handle member 14 and the outer leg of member 15.

When the strainer is applied to a container for use, handle 14 of the latch or clip is drawn upward toward handle 12 as illustrated by dotted lines in Fig. 1, thus increasing the width of the opening into the lower portion of member 15 and after the latter has been slipped over the edge of the container, handle 14 is released and lip 16 will now grip the edge of the container against the fixed end of member 15 and thus firmly anchor the strainer in position for use.

In the modified construction illustrated in Figs. 4 and 5, 20 designates a shallow cup or bowl shaped member to the edge of which is connected, by an inverted U-shaped member 21 and a U-shaped member 22, an outwardly projecting handle 23.

The metal from which the bowl and handle are formed is resilient and cut from the longitudinal portions of members 21 and 22 is a narrow strip of metal 24 which provides the latch or clip. The main body portion of this clip lies beneath handle 23 and in front of the connected legs of the portions 21 and 22, the metal in the clip is bent toward the edge of bowl 20 to form a lip 25 which, when the utensil is applied to a receptacle as shown in Fig. 4, grips the wall of said receptacle to secure said utensil thereon, during the poaching of eggs.

While I prefer to form the clip 24 from the metal used in forming bowl 20 and handle 23, said clip may, if desired, be separately formed and secured to the handle by riveting or spot welding.

In the form of device illustrated in Figs. 1, 2 and 3 both parts 10 and 14 may be formed of metal or plastics or one part of metal and the other of plastics.

Thus it will be seen that I have provided a cooking utensil such as a strainer or egg poacher, which is simple in structure, inexpensive of manufacture and very effective in performing the functions for which it is intended.

It will be understood that minor changes in the size form and construction of the various parts of my improved strainer and egg poacher may be made and substituted for those herein shown and described without departing from the spirit of my invention, the scope of which is set forth in the appended claim.

I claim as my invention:

A culinary utensil formed from a single piece of thin material and comprising a bowl, a narrow inverted U-shaped member projecting upwardly from the edge of said bowl, a U-shaped member having its inner leg connected to the outer leg of said inverted U-shaped member, a handle projecting outwardly from the outer leg of said U-shaped member, a narrow longitudinally disposed strip cut from said U-shaped member, with a portion of said strip extending inward toward the bowl beneath said inverted U-shaped member and thence outward to form a horizontally disposed U-shaped receptacle engaging lip and that portion of said strip outwardly from the lower leg of said lip, extending through the opening formed by the cutting of said strip from both legs of said U-shaped member to provide a handle for flexing said lip away from said bowl which last mentioned handle is disposed below and parallel with said first mentioned handle.

LOUIS FRANK.